Patented Nov. 18, 1952

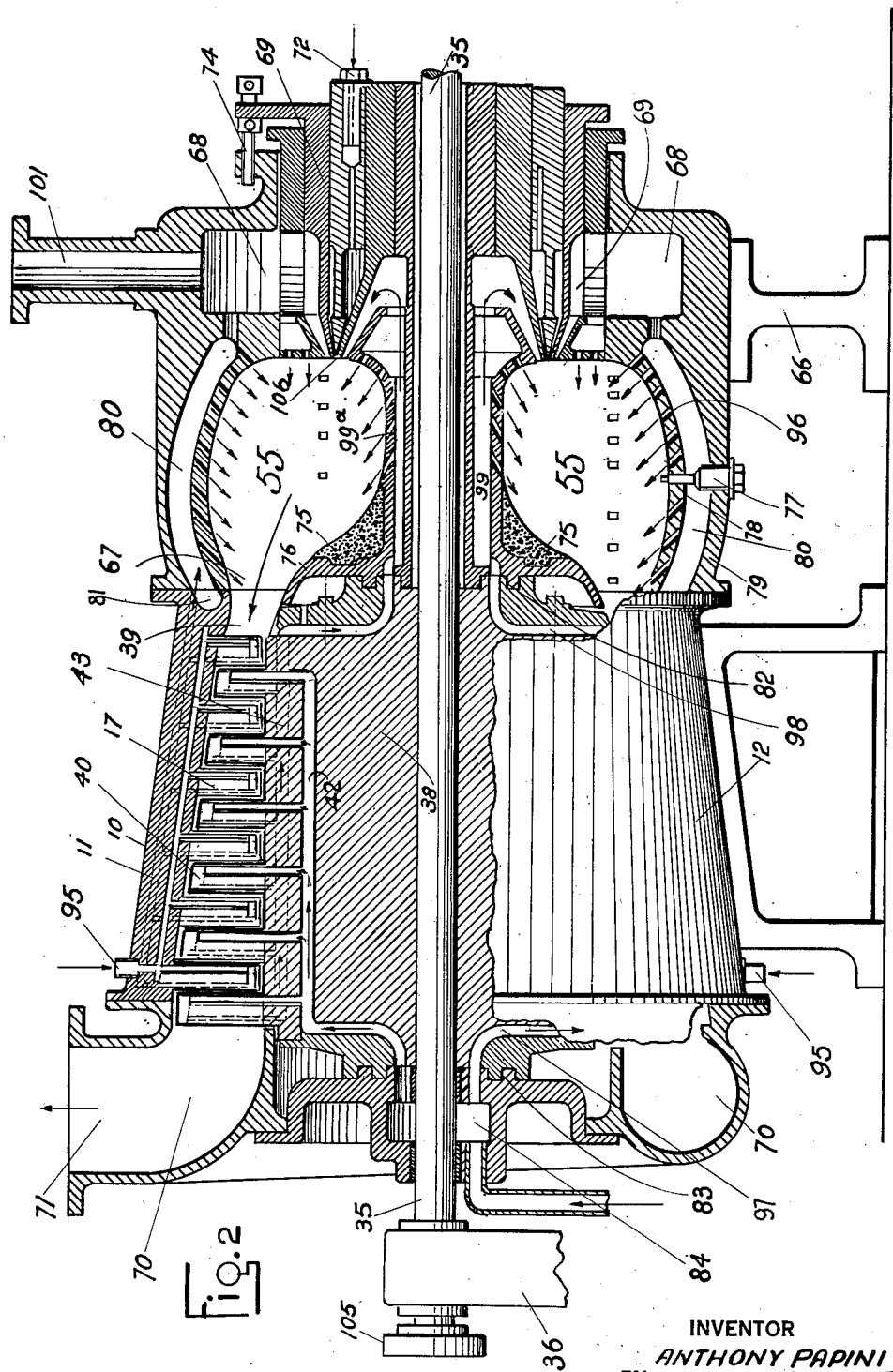

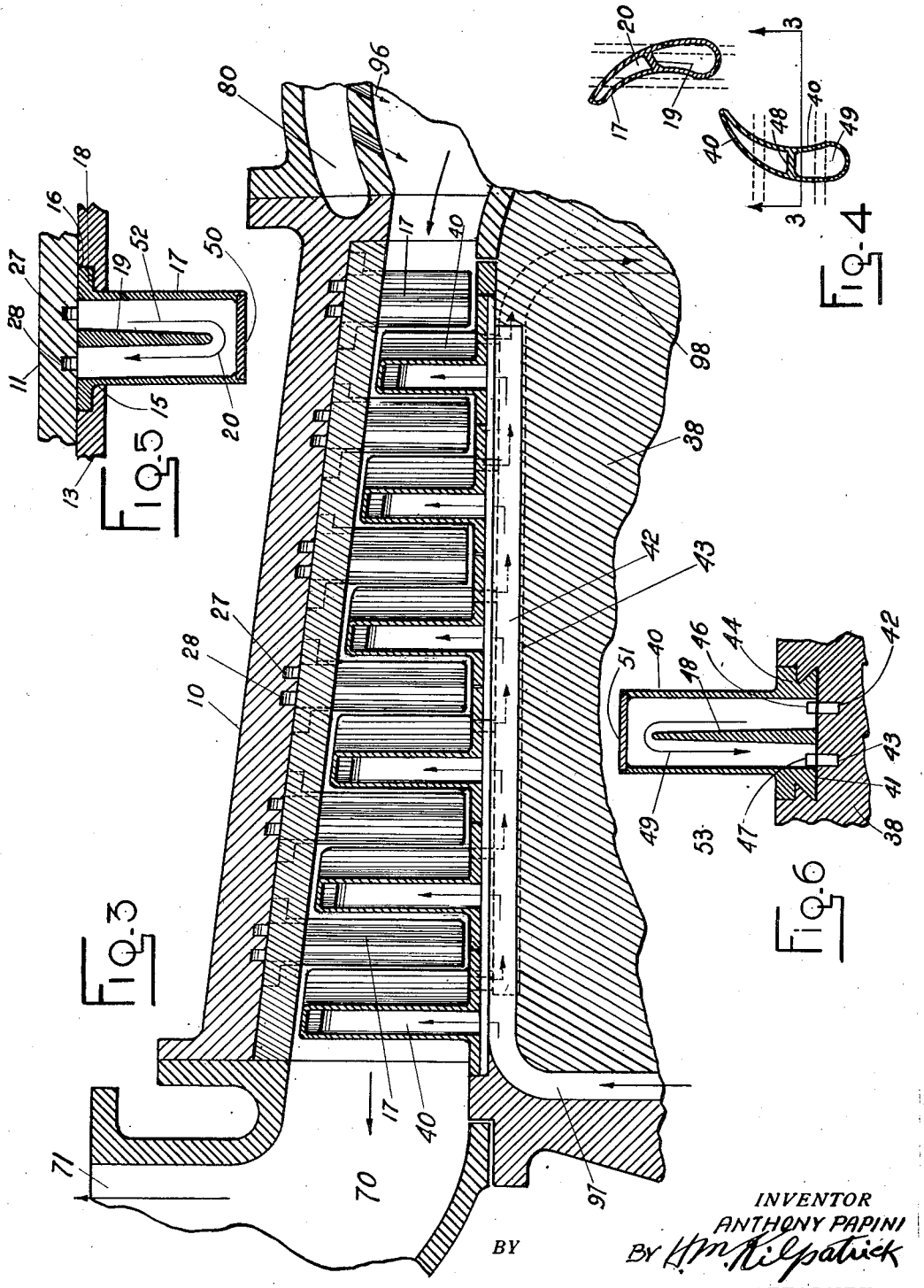

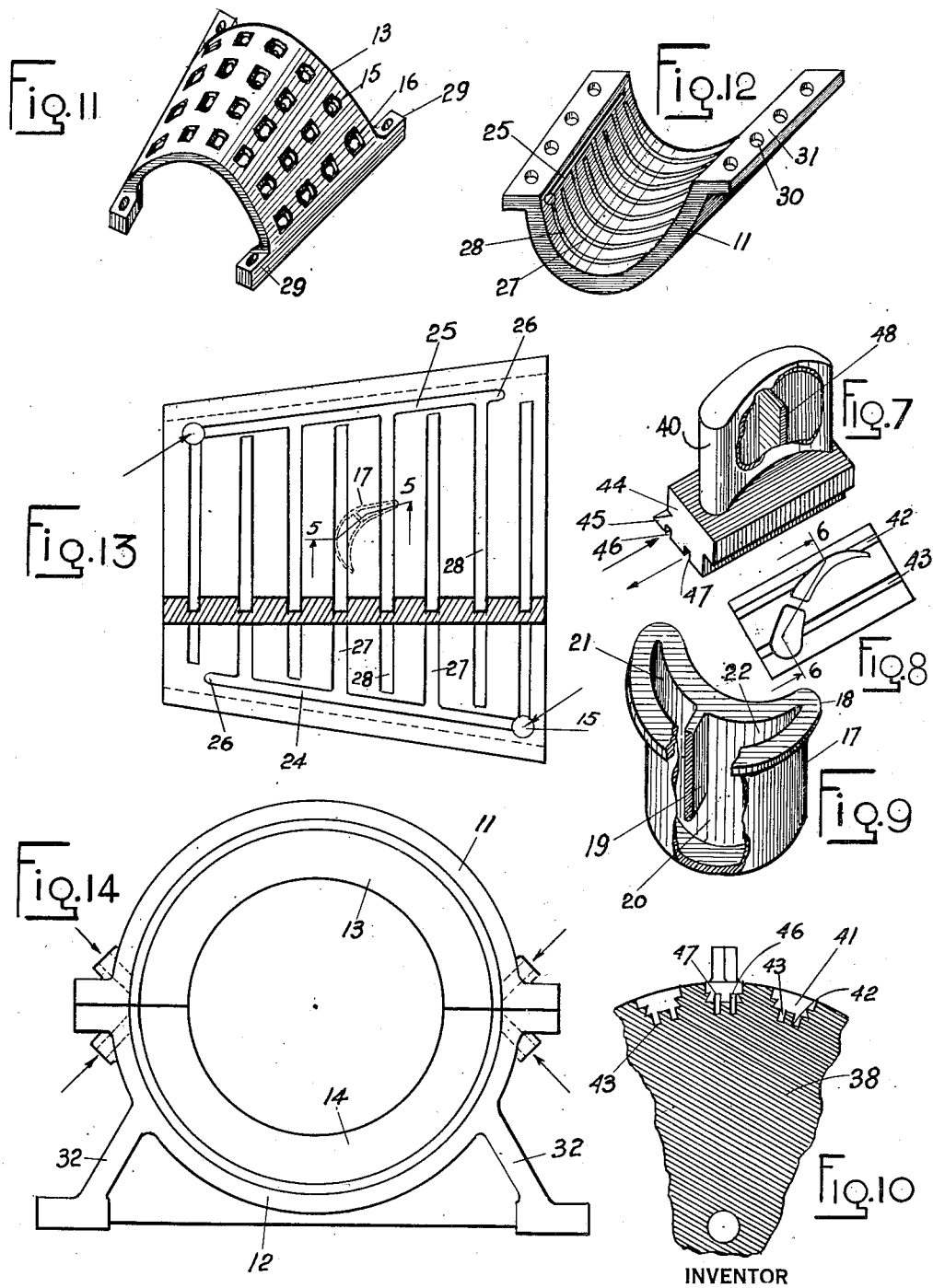

2,618,120

UNITED STATES PATENT OFFICE 2,618,120

COAXIAL COMBUSTION PRODUCTS GENERATOR AND TURBINE WITH COOLING MEANS

Anthony Papini, Ridgefield, N. J.

Application June 7, 1946, Serial No. 675,086

9 Claims. (Cl. 60—39.36)

This invention relates to improvements in turbines and particularly to gas turbines, and has for its principal object the increase of the thermal efficiency of gas turbines. At present, the common heretofore known method for increasing efficiency is by use of large heat exchangers, which is cumbersome and expensive. Nevertheless, in this old method it is necessary to maintain the inlet temperature low and at a temperature which the turbine blade material could withstand in continuous operation. As the temperature of the heat generated in the combustion chamber is in the neighborhood of 2400 degrees F., and the inlet temperature of the flow of gases to the blades is about 1000 degrees F., it is evident that a large amount of excess air must be used to cool off the gases, with the result of a considerable loss of efficiency. The necessity of this large amount of excess air requires a very large compressor and consequently a great amount of power to drive the latter.

My invention relates mainly to the provision of internally air-cooled turbine blades by the use of which the inlet temperature of the gases driving the turbine can be increased by several hundred degrees, thereby effecting a marked increase of thermal efficiency. In addition, because of the higher inlet temperature, less excess air is needed than heretofore, and consequently a smaller compressor is required, and a smaller turbine is required to drive the compressor.

Air-cooled blades of tubular form are in current use, but because of mechanical difficulties, the known type of blade can be used only in single-stage turbines. The efficiency of such single-stage turbines is low, even when compared with multiple-stage turbines having solid blades in which the inlet temperature is as low as 1000 degrees F. The above mentioned single stage turbines are used in superchargers and in connection with jet propulsion, where the requirements of economy is not too important.

My improved internally air cooled blades are especially suitable for use in multiple-stage turbines. Cooling air is circulated through the blades, and the temperature of the blades is maintained below the temperature which a solid blade can safely withstand. The cooling of the blades is accomplished efficiently, and the heat withdrawn by circulating air is recuperated as will be explained. As the whole of this process is performed within the turbine itself, thermal losses are negligible.

Other objects of the invention are to effect simplicity and efficiency in such turbines and blades and to provide an extremely simple turbine and blade which are economical, durable and reliable in operation, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a multiple-stage gas turbine which briefly stated, includes a frustum-shaped stator having stages of inwardly projecting hollow blades having openings at the root or base end, and inlet and outlet ducts communicating with said openings respectively. A rotor spaced coaxially within the stator is provided with stages of hollow rotor blades provided with openings at the base end, the stator having inlet and outlet channels communicating with said openings respectively. A combustion chamber receiving fuel from a nozzle surrounded by a nozzle chamber, has an annular discharge port discharging combustion gases into the space between the rotors for reacting on the blades.

A compressor delivers compressed air to an intercooler from which conduit means delivers cooled compressed air through said inlet ducts into the stator blades and thence to said outlet ducts; and conduit means delivers cooling air from the intercooler through said inlet channels of the rotor into the rotor blades and thence to said outlet channels. Said cooling air cools the blades and is warmed thereby; and conduit means delivers the warmed air from said outlet ducts and channels into the combustion chamber for supporting combustion therein. Conduit means also delivers compressed air direct from the compressor to the nozzle chamber and thence to the combustion chamber to cool the combustion gases enough to prevent injury to the blades.

In the accompanying drawing showing one of many possible embodiments of my invention, Fig. 1 is a diagrammatic side elevation, partly in axial section and having parts removed, showing an open cycle gas turbine system incorporating my improvements;

Fig. 2 shows an axial section partly in side elevation of the gas turbine proper, showing how cooling air is supplied to the hollow blades, how it is exhausted, and how it is introduced into the combustion chamber;

Fig. 3 is a fragmental vertical axial section showing part of the rotor and stator and blades, the section being taken along the blades as indicated by the line 3—3 of Fig. 4;

Fig. 4 is a section taken transversely through a pair of blades of Fig. 3;

Fig. 5 is a longitudinal cross section of one of the stator hollow blades, the section being taken along the line 5—5 of Fig. 13;

Fig. 6 is a longitudinal section of the rotor blade, the section being taken along the line 6—6 of Fig. 8;

Figs. 7 and 8 are respectively a perspective view with the part broken away, and an inner end elevation of a preferred form of the hollow blades of the rotor;

Fig. 9 is a perspective view partly broken away showing a preferred form of the hollow blades of the stator;

Fig. 10 is a fragmental transverse sectional view of the rotor body, showing seats or ways for the insertion of the rotor blades, and inlet and exhaust ducts for passing the cooling air through the blades;

Fig. 11 is a perspective view showing an inner stator half shell with openings into which the stator blades are inserted;

Fig. 12 is a perspective view of an outer stator half shell, shows ducts for the admission of cooling air to blades and for the exhaust of air therefrom;

Fig. 13 shows diagrammatically a development and cross section of the half shell of Fig. 12, the cross-section showing the transverse channels; and Fig. 14 is an end elevation of the stator body composed of two conical shells assembled, the blades and opening therefor being omitted.

Figure 1:
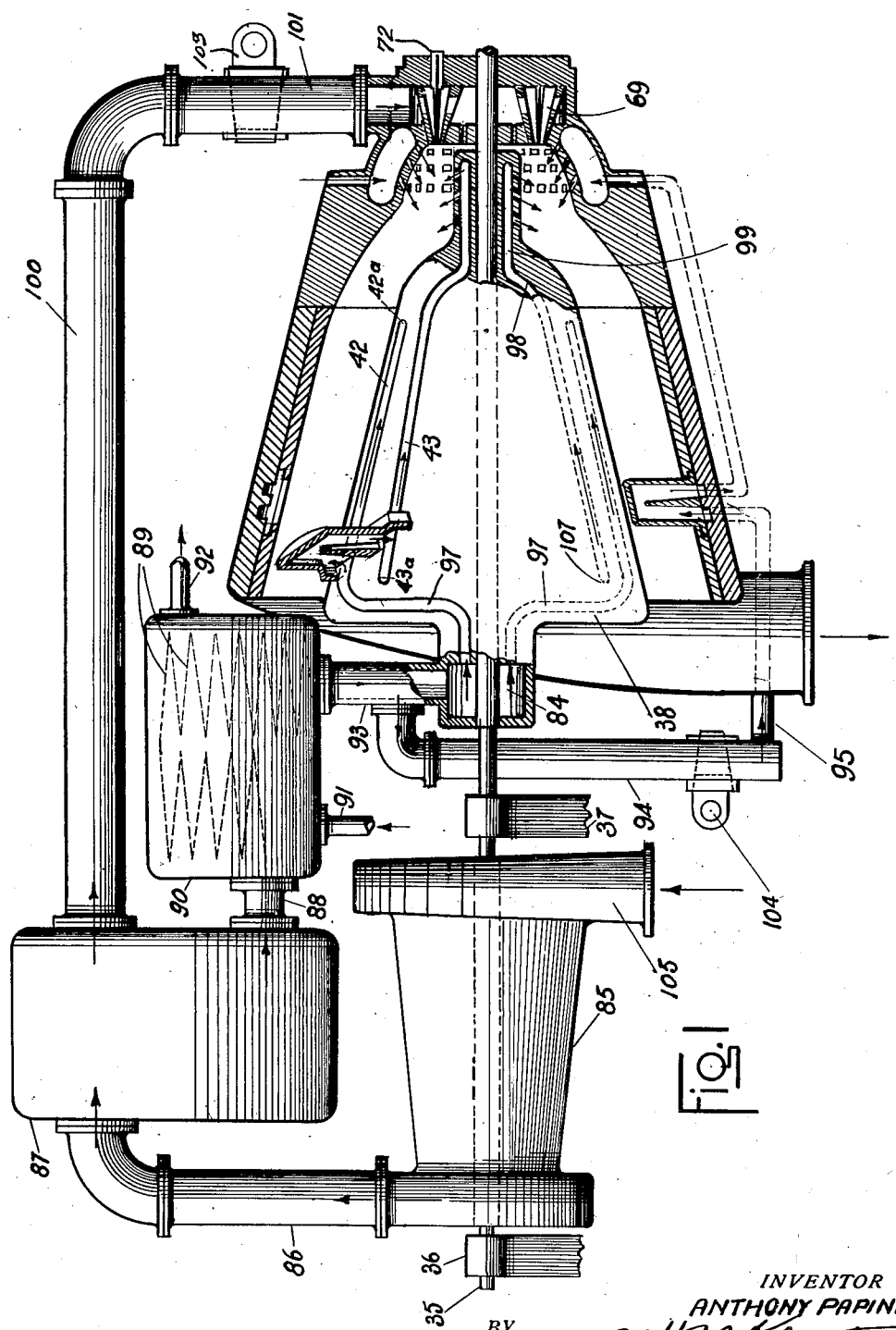

My invention is embodied in an improved multiple-stage turbine comprising a stator 10 comprising two outer half shells 11, 12 (Figs. 2, 3, 12 and 14) and two semi-frustum-shaped inner half shells 13, 14 (Figs. 11 and 14), the latter cooperating to form a frustum-shaped inner shell having blade openings 15 therein countersunk as at 16 (Fig. 5) at the outer face and receiving stages of hollow blades 17 projecting inwardly through said openings 15, each blade having a flange base 18 (Figs. 5 and 9) fitted in the countersink 16 flush with the outer face of the shell. Each hollow blade 17 is open at the base end and is provided with a partition 19 extending from the base and nearly to the free end to form a U-shaped passage 20 through the blade having openings 21, 22 through the base.

The outer shell composed of the two half shells 11, 12 is fitted air-tight, as will be explained, on the blade bases 18 and the outer face of the inner shell, and is provided in its inner face at the margins of the half shells with spaced longitudinal inlet and outlet ducts 24, 25 (Figs. 12 and 13) having dead ends 26. Sets of spaced inlet and outlet channels 27, 28 communicate respectively with opposite ends of said passages 20 and with said inlet and outlet ducts 24, 25 respectively.

After the stator blades 17 are properly inserted as in Fig. 5 and fastened in the apertures 15 of the inner shell, the two half inner shells are fastened together by bolts passed through lugs 29 (Fig. 11), thus forming a frustum of cone, after which the outer surface of such cone is accurately ground to cone shape.

After the channels 25, 26, 27, 28 are properly machined, the stator outer shells 11, 12 (Figs. 12 and 14) are bolted together by bolts passing through the bolt holes 30 in the flanges 31; and the inside surface is accurately ground to cone shape, after which the inner shell is inserted into the outer shell and with the use of grinding compound the two surfaces are ground to an airtight fit, after which the lugs 29 are cut off. The stator is supported on legs or supports 32 integral with the lower outer shell 12.

A shaft 35 mounted in bearings 36, 37 and a third bearing (not shown) to the right of Fig. 2 carries a rotor 38 for rotation coaxially within and spaced from the stator 10 to provide a turbine space receiving said blades 17 and blades 40 later to be described, the rotor being provided in its peripheral face with longitudinal dovetailed ways 41 (Figs. 10 and 6) and in the bottom of said ways with parallel longitudinal inlet and outlet channels 42, 43 closed at respectively opposite ends 42a and 43a. The hollow rotor blades 40 (Figs. 2, 6 and 7) in said turbine space have contacting rectangular bases 44 provided with dovetail projections dovetailed in said ways 41 and provided with short longitudinal channels 46, 47 registering with said channels 42, 43 of the rotor.

Each rotor blade has a longitudinal partition 48 extending from its base to near the free end of the blade to provide a U-shaped passage 49 communicating at opposite ends through said short channels 46, 47 with said longitudinal inlet and outlet channels 42, 43 respectively.

The dovetailed projection 45 may slide longitudinally into the dovetailed ways 41 and be there held in position. In assembly the rotor body 38 (Fig. 10) is heated to a temperature above the working temperature of the turbine after which the blades are inserted through the ends of the ways into place. The rotor body is then cooled and shrunk on the blade bases, so that when the turbine is in operation and the working temperature is reached, the blade remains firmly in position.

The blades 17 and 40 may be cast in tubular form, open at both ends for the purpose of facilitating the removal of the molding sand from the inside. A top or cap 50 or 51 is welded or fastened in any suitable manner in the free end of the blade. The partitions 19 and 48 extend from the base of the blade nearly to its free end, leaving sufficient space between the partition and the cap to allow free circulation of cooling air. The partition cooperates with the walls of the blade and said cap to provide a substantially U-shaped passage space as shown by the arrows 52 (Fig. 5) and 53 (Fig. 6).

An annular combustion chamber 55 (Fig. 2) supported on the support 66 has an annular discharge port 67 joining and discharging into the turbine space 39 at the smaller ends of the shells; and an annular nozzle chamber 68 contains an annular nozzle therein discharging fuel into the combustion chamber at the end thereof remote from the stator.

Gases from the turbine space 39 exhaust into the annular exhaust chamber 70 fast on the stator and out through the exhaust port 71.

The nozzle 69 is of a common annular type and does not require explanation. Oil enters the nozzle at the inlet 72 from a suitable supply source such as an oil tank and a pressure pump (not shown).

The nozzle is screwed longitudinally in the chamber 68, and after proper adjustment is locked in position by lock screws 74.

A refractory lining 75 in the combustion chamber is set in position to receive the hottest flame of the combustion, and serves the double purpose of protecting the wall 76 from being burned out, and providing an incandescent surface to facilitate the ignition of gases.

A spark plug 77 to ignite the combustion gases in the combustion chamber when starting the turbine, is mounted in the wall 78 of the chamber 55 and the wall 79 of the annular air chamber 80 later to be described cooperating with the annular port 81 of the stator.

A labyrinth 82 is provided between the stationary combustion chamber and the rotor 38 to prevent the escape of the exhaust air; and a labyrinth 83 is provided between the rotor and the annular chamber 84 later to be described.

A compressor 85 disposed on said shaft 35 delivers compressed air through a pipe 86, tank 87 and connector 88 to the coil 89 (indicated by dotted lines) of an intercooler 90. Cooling water is admitted to the intercooler 90 through inlet pipe 91 and passes out through outlet pipe 92; and conduit means comprising pipes 93, 94, 95 delivers cooled compressed air from the intercooler coil through said longitudinal inlet ducts 24 (Fig. 13) of the stator, and transverse inlet ducts 27 to said passages 20 of the stator blades and thence through the outlet ducts 25 and annular port 81 of the stator, and thence to the annular air chamber 80, through apertures 96 into the outer periphery of the combustion chamber.

Conduit means comprising the pipe 93, annular chamber 84 fast on the exhaust chamber and radial passages 97 in the rotor and communicating with the chamber 84 deliver cooled compressed air through said inlet channels 42 (Fig. 6) of the rotor to said passages 49 of the rotor blade and thence to said outlet channels 43 of the rotor. Conduit means comprising radial channels 98 and a duct 99 of annular cross-section around the shaft 35 delivers air from said outlet channels 43 through aperture 99a into the inner periphery of the combustion chamber.

Conduit means comprising the tank 87 and pipes 86, 100, 101 delivers compressed air from the discharge of the compressor 81 through the air tank 87 to the nozzle chamber 68 from which it is discharged and mixes the fuel from the nozzle 69.

Air flow through the blades requires a careful regulation, and to this end cooperating valves 103 and 104 are inserted in pipes 101 and 94 respectively.

The usual power coupling 105 (Fig. 2) and starter (not shown) may be connected to either end of the shaft 35.

The operation of the turbine will be easily understood from the foregoing and now need be only briefly summarized.

Atmospheric air enters the compressor 85 at the inlet 105 and passes through the outlet pipe 86 to the air tank 87. From this tank a portion of the air passes through the pipes 100, 101 to the annular nozzle chamber 68 enclosing the annular nozzle 69. From the annular nozzle chamber the air passes through apertures 106 to the combustion chamber 55.

A portion of the air from the tank 87 passes through the connection 88 to the intercooler 90, where it passes through the coil 89 indicated by the dotted lines. Cooling water being admitted to the intercooler through inlet pipe 91 and passing out through outlet pipe 92, cools the air in the coil 89.

Air from intercooler coil 89 passes into the pipe 93 and part of this air then passes to an annular chamber 84, another part passing through the pipes 94, 95 into longitudinal inlet ducts 24 (Fig. 13). Another part of the air passes from the pipe 93 through the annular chamber 84 into radial ducts 97 and thence into longitudinal inlet channels 42 (Figs. 6 and 10), each having a blind end 42a at the right end of the rotor as in Fig. 1. Adjacent to channels 42 are similar outlet or exhaust channels 43, each having a blind end 43a at the left end of the rotor as in Fig. 1.

The outlet channels 43 discharge into channels 98, 99 (Figs. 1 and 2), from which air enters through sets of apertures 99a into the combustion chamber.

From intercooler coil 89 part of the cooling air passes through pipes 94, 95 into the longitudinal inlet ducts 24 Fig. 13 of the outer shells 11, 12 of the stator and passes into the transverse ducts 27 which communicate with the passages 20 of the blades 17. The air then circulates through the blades 17 and escapes into transverse channels 28 and longitudinal ducts 25 and into the air chamber 80 from which it passes through a set of apertures 96 into the combustion chamber 55.

A spark from the spark plug 77 is used to ignite the combustion gases in the combustion chamber, when starting the turbine. The compressed air which is supplied to the combustion chamber from the pipe 101 annular chamber 68 and aperture 106, is supplied in the proper amount to cool the high temperature of the combustion, to a temperature that air cooled blades can safely withstand, while exhaust air coming from blades through the apertures 96 and 99a is of an amount which added to the air from the chamber 68 will properly support the combustion.

Manipulating valves 103 and 104 effect the proper flow of cooling air through the blades of both rotor and stator. The pressure, the temperature, and the amount of air entering the blades are kept at such a degree that the blades are maintained at a temperature slightly below the maximum temperature which the blade material can safely withstand under continuous operation.

Above I have explained the principle of my air-cooled blades and turbine and illustrated a preferred form of the elements constituting it. It is understood that changes may be made by those skilled in this particular art without departing from the spirit and scope of the invention as claimed.

I claim as my invention:

1. In combination, an annular stator; a rotor spaced coaxially within the stator to provide a space having annular inlet and exhaust ports; hollow blades in said space having therethrough inlet and outlet openings and mounted on said stator and rotor respectively; an annular combustion chamber coaxially joined fast to the stator, and having a discharge port registering with said inlet port and provided in its outer and inner peripheries with outer and inner apertures; an air chamber surrounding and communicating with the outer apertures; an annular duct surrounded by and communicating with the inner apertures; said stator and rotor having inlet and outlet ducts communicating respectively with said inlet and outlet openings of the blades carried thereby; a compressor communicating with said inlet ducts; and conduit means connecting the rotor and stator outlet ducts with said annular duct and said air chamber respectively.

2. In combination, an axially elongated stator; an axially elongated rotor spaced coaxially within the stator to provide a turbine space having inlet and exhaust ends; hollow blades in said space having bases having therethrough inlet and outlet openings and mounted on said stator and rotor respectively; an annular combustion chamber coaxially joined fast to the inlet end of the stator, and having a discharge port registering with said inlet end and provided in its outer and inner peripheries with outer and inner apertures; a fuel nozzle remote from said port discharging into the chamber; an air chamber surrounding and communicating with the outer apertures; an annular duct surrounded by and communicating with the inner apertures; said stator and rotor having inlet and outlet ducts communicating respectively with said inlet and outlet openings of the bases carried thereby; a compressor communicating with said inlet ducts; conduit means connecting the rotor and stator outlet ducts with said annular duct and said air chamber respectively; whereby cooling air from the compressor is conducted through the inlet ducts and the blades to be heated in the blades and is then in heated condition conducted to the combustion chamber to support combustion and to restore to the combustion chamber heat lost in cooling the blades.

3. In combination, an axially elongated frustum shaped stator; an axially elongated rotor spaced coaxially within the stator to provide a turbine space therebetween having an inlet end and a larger exhaust end; stages of hollow blades in said space having bases mounted alternately on said stator and rotor respectively and having inlet and outlet openings therethrough; a stationary annular combustion chamber coaxial with the rotor and stator and joined fast to the inlet end of the stator, and provided with an annular discharge port registering with and discharging into the adjacent end of said space and provided in its outer and inner peripheries with outer and inner apertures directed approximately toward the discharge port; an annular fuel nozzle coaxial with the combustion chamber and discharging into the chamber toward and remote from said discharge and an air chamber surrounding and communicating with the outer apertures; an annular duct surrounded by and communicating with the inner apertures; said stator and rotor having inlet and outlet ducts communicating respectively with said inlet and outlet openings of the bases carried thereby; a compressor communicating with said inlet ducts; conduit means connecting the rotor and stator outlet ducts with said annular duct and said air chamber respectively.

4. A turbine stator comprising a frustum shaped inner shell having blade openings therein, countersunk at the outer face; hollow blades projecting inwardly through said openings, each having a flanged base fitted in the countersink flush with the outer face of the shell; said blade being open at the base end and provided with a partition extending from the base and nearly to the free end to form a U-shaped passage through the blade; an outer shell fitted air-tight on the blade bases and the outer face of the inner shell and provided at its inner face with spaced longitudinal inlet and outlet ducts and with sets of spaced transverse inlet and outlet channels communicating with opposite ends respectively of said passages and communicating with said inlet and outlet ducts respectively.

5. In combination, an axially elongated stator; an axially elongated rotor spaced coaxially within the stator to provide a turbine space having inlet exhaust ends; hollow blades in said space having bases having therethrough inlet and outlet openings and mounted on said stator and rotor respectively; an annular combustion chamber coaxially joined fast to the inlet end of the stator, and having a discharge port registering with said inlet end and provided in its outer and inner peripheries with outer and inner apertures; a fuel nozzle remote from said port discharging into the chamber; an annular air chamber surrounding the combustion chamber and communicating with the outer apertures; an annular duct coaxial with and surrounded by the combustion chamber adjacent to and communicating with the inner apertures; said stator and rotor each having inlet and outlet ducts communicating with said inlet and outlet openings respectively of the blades carried thereby; conduit means connecting the rotor outlet ducts with said annular conduit; conduit means connecting the stator outlet ducts with annular air chamber.

6. In combination, an axially elongated stator; an axially elongated rotor spaced coaxially within the stator to provide a turbine space having inlet and exhaust ends; hollow blades in said space having bases having therethrough inlet and outlet openings and mounted on said stator and rotor respectively; a combustion chamber having a discharge port registering with said inlet end; said stator and rotor having inlet and outlet ducts communicating respectively with said inlet and outlet openings of the bases carried thereby; the sum of the lengths of the inlet and outlet ducts associated with each blade being approximately equal; a compressor; conduit means from said compressor having branches; conduit means connecting one of said branches with the inlet ducts of the stator; conduit means connecting the other branch with the inlet ducts of the rotor; conduit means connecting the rotor outlet ducts with the combustion chamber; conduit means connecting the stator outlet ducts with the combustion chamber; whereby cooling air from the compressor is evenly conducted through the blades to be heated in the blades and is then in heated condition conducted to the combustion chamber.

7. In a turbine, a frustrum shaped shell having therein countersunk blade openings; hollow blades projecting through said openings, each having a flanged base fitted in the countersink; each blade being provided with a passage extending through the base; and a second shell fitted on the blade bases and the first named shell and provided with channels communicating with said passages.

8. A turbine stator comprising an inner shell having therein blade openings countersunk at the outer face; hollow blades projecting inwardly through said openings, each having a flanged base in the countersink; each blade being provided with a passage extending through the base; an outer shell fitted gas-tight on the blade bases and the inner shell and provided in its inner face with inlet and outlet ducts and with sets of inlet and outlet channels communicating with opposite ends respectively of said passages and communicating with said inlet and outlet ducts respectively.

9. A turbine stator comprising a frustrum shaped inner shell having therein blade openings countersunk at the outer face; hollow blades projecting inwardly through said openings, each having a flanged base fitted in the countersink flush with the outer face of the shell; each stator blade being provided with a U-shaped passage extending through the base, and intermediately to near the free end of the blade; an outer shell fitted gas-tight on the blade bases and the inner shell and provided in its inner face with spaced longitudinal inlet and outlet ducts and with sets of spaced transverse inlet and outlet channels communicating with opposite ends respectively of said passages and communicating with said inlet and outlet ducts of the stator respectively; the stator blades being replaceable on removing the outer shell.

ANTHONY PAPINI.

REFERENCES CITED

The following references are of record in the file of this patent:

UNITED STATES PATENTS

| Number | Name | Date |
|---|---|---|
| 1,318,091 | Ljungström | Oct. 7, 1919 |
| 1,721,197 | Almen | July 16, 1929 |
| 1,793,468 | Densmore | Feb. 24, 1931 |
| 1,819,728 | Baugh | Aug. 18, 1931 |
| 1,864,741 | Koch | June 28, 1932 |
| 1,938,688 | Brooke | Dec. 12, 1933 |
| 1,960,810 | Gordon | May 29, 1934 |
| 2,038,670 | Noack | Apr. 28, 1936 |
| 2,272,831 | Chalupa | Feb. 10, 1942 |
| 2,279,258 | Allen | Apr. 7, 1942 |
| 2,303,381 | New | Dec. 1, 1942 |
| 2,369,795 | Planiol | Feb. 20, 1945 |
| 2,445,837 | McKenzie | July 27, 1948 |
| 2,461,402 | Whitehead | Feb. 8, 1949 |
| 2,475,772 | Allen | July 12, 1949 |
| 2,540,902 | Moore | Feb. 6, 1951 |
| 2,560,118 | Malone | July 10, 1951 |

FOREIGN PATENTS

| Number | Country | Date |
|---|---|---|
| 184,879 | Great Britain | Aug. 21, 1922 |
| 537,121 | Great Britain | June 10, 1941 |
| 369,996 | Germany | Feb. 26, 1923 |
| 597,556 | Germany | June 2, 1934 |